United States Patent
Fedynyshyn et al.

(10) Patent No.: US 10,851,251 B2
(45) Date of Patent: Dec. 1, 2020

(54) BLOCK COPOLYMER INK FORMULATION FOR 3D PRINTING AND METHOD OF MAKING A 3D PRINTED RADIOFREQUENCY (RF) DEVICE

(71) Applicants: President and Fellows of Harvard College, Cambridge, MA (US); Massachusetts Institute of Technology, Boston, MA (US)

(72) Inventors: Theodore H. Fedynyshyn, Sudbury, MA (US); Michael T. Lis, North Andover, MA (US); Jennifer Ann Lewis, Cambridge, MA (US)

(73) Assignees: Massachusetts Institute of Technology, Cambridge, MA (US); President and Fellows of Harvard College, Cambridge, MA (US)

( * ) Notice: Subject to any disclaimer, the term of this patent is extended or adjusted under 35 U.S.C. 154(b) by 77 days.

(21) Appl. No.: 15/773,282

(22) PCT Filed: Nov. 1, 2016

(86) PCT No.: PCT/US2016/059858
§ 371 (c)(1),
(2) Date: May 3, 2018

(87) PCT Pub. No.: WO2017/079130
PCT Pub. Date: May 11, 2017

(65) Prior Publication Data
US 2018/0320008 A1 Nov. 8, 2018

Related U.S. Application Data

(60) Provisional application No. 62/250,032, filed on Nov. 3, 2015.

(51) Int. Cl.
| | |
|---|---|
| *C09D 11/106* | (2014.01) |
| *B33Y 80/00* | (2015.01) |
| *B33Y 70/00* | (2020.01) |
| *B29C 64/118* | (2017.01) |
| *B29C 64/209* | (2017.01) |
| *C09D 11/033* | (2014.01) |
| *C09D 11/101* | (2014.01) |
| *B33Y 10/00* | (2015.01) |
| *C08K 3/013* | (2018.01) |
| *B29L 31/34* | (2006.01) |
| *C08F 236/06* | (2006.01) |
| *C08F 236/08* | (2006.01) |
| *C08F 236/10* | (2006.01) |

(52) U.S. Cl.
CPC .......... *C09D 11/106* (2013.01); *B29C 64/118* (2017.08); *B29C 64/209* (2017.08); *B33Y 70/00* (2014.12); *B33Y 80/00* (2014.12); *C09D 11/033* (2013.01); *C09D 11/101* (2013.01); *B29L 2031/3456* (2013.01); *B33Y 10/00* (2014.12); *C08F 236/06* (2013.01); *C08F 236/08* (2013.01); *C08F 236/10* (2013.01); *C08K 3/013* (2018.01); *C08K 2201/001* (2013.01)

(58) Field of Classification Search
CPC ....... B33Y 80/00; B33Y 70/00; C09D 11/033; C09D 11/106; B29C 64/209; B29C 64/118
USPC ........................................................ 523/160
See application file for complete search history.

(56) References Cited

U.S. PATENT DOCUMENTS

| | | | |
|---|---|---|---|
| 7,485,366 B2 | 2/2009 | Ma et al. | |
| 2012/0232206 A1 | 9/2012 | Wu et al. | |
| 2014/0353862 A1 | 12/2014 | Erdman | |
| 2015/0001762 A1* | 1/2015 | Lacaze .................. | B29C 64/106 264/308 |
| 2015/0165675 A1 | 6/2015 | Dawson et al. | |
| 2016/0122570 A1 | 5/2016 | Chae et al. | |

(Continued)

FOREIGN PATENT DOCUMENTS

| | | |
|---|---|---|
| CN | 103756236 A | 4/2014 |
| CN | 103980591 A | 8/2014 |

(Continued)

OTHER PUBLICATIONS

International Search Report dated Jul. 4, 2019 from corresponding PCT/US2019/024941, pp. 5.

(Continued)

*Primary Examiner* — Doris L Lee
(74) *Attorney, Agent, or Firm* — Nelson Mullins Riley & Scarborough LLP; Thomas J. Engellenner; Reza Mollaaghababa

(57) ABSTRACT

An ink formulation for 3D printing comprises a triblock copolymer in a solvent, where the triblock copolymer includes end blocks comprising an aromatic or acrylate polymer and a midblock between the end blocks comprising an aliphatic polymer. The ink formulation exhibits a shear thinning threshold of about 0.02 rad/sec or less. A method of making a 3D printed radiofrequency (RF) device comprises extruding an ink formulation from a deposition nozzle moving relative to a substrate, where the ink formulation comprises a triblock copolymer in a solvent and the triblock copolymer includes end blocks comprising an aromatic or acrylate polymer and a midblock between the end blocks comprising an aliphatic polymer. One or more continuous filaments comprising the ink formulation are deposited in a predetermined pattern on the substrate, and the ink formulation is treated to remove or cure the solvent, thereby forming a printed RF device.

25 Claims, 5 Drawing Sheets

(56) References Cited

U.S. PATENT DOCUMENTS

| 2016/0263823 A1 | 9/2016 | Espiau et al. |
| 2016/0319122 A1* | 11/2016 | Niessner ............... B29C 64/106 |
| 2016/0346997 A1 | 12/2016 | Lewis et al. |
| 2018/0320008 A1 | 11/2018 | Fedynyshyn et al. |
| 2019/0300741 A1 | 10/2019 | Duncan et al. |

FOREIGN PATENT DOCUMENTS

| CN | 103980594 A | | 8/2014 |
| CN | 103980672 A | | 8/2014 |
| CN | 103980675 A | | 8/2014 |
| CN | 104031304 A | | 9/2014 |
| JP | 3838730 B2 | | 10/2006 |
| WO | 2014194155 A1 | | 12/2014 |
| WO | 2014204450 A1 | | 12/2014 |
| WO | 2015091814 A1 | | 6/2015 |
| WO | WO 2015/091814 | * | 6/2015 |
| WO | 2016145309 A1 | | 9/2016 |
| WO | 2017079130 A1 | | 5/2017 |
| WO | 2019195117 A1 | | 10/2019 |

OTHER PUBLICATIONS

International Written Opinion dated Jul. 4, 2019 from corresponding PCT/US2019/024941, pp. 8.

"Polymer Dielectrics for 3D-Printed RF Devices in the Ka Band," by Michael Lis et al., Advanced Materials Technologies, DOI: 10.1002/admt.201600027, Wiley-VCH Verlag GmbH & Co. KGaA, 69469 Weinheim, Germany, 2016, 5 pages.

"A New Flexible and Multi-Purpose System Design for 3-Dimensional Printing," by Ho-Lung Li et al., Proceedings of the ASME 2011 International Manufacturing Science and Engineering Conference, MSEC2011, Jun. 13-17, 2011, Corvallis, Oregon, USA, 7 pages.

"The Properties of an UV Curable Support Material Pre-Polymer for Three Dimensional Printing," by Huang Bing et al., Journal of Wuhan University of Technology-Mater, Sci. Ed., Apr. 2010, vol. 25, No. 2, DOI: 10.1007/s11595-010-2278-6, pp. 278-281.

"Shape-Memory Polymers," by Marc Behl et al., Center for Biomaterial Development, Institute of Polymer Research, Materials Today, Apr. 2007, vol. 10, No. 4, pp. 20-28.

United States Patent and Trademark Office, Alexandria, Virginia, International Search Report of International Application No. PCT/US2016/059858 dated Feb. 21, 2017, 4 pages.

"Polymer Dielectrics for 3D-Printed RF Devices in the Ka Band," by Michael Lis et al., Advanced Materials Technologies, vol. 1, Issue 2 (May 6, 2016) pp. 1-6.

"Developing Flexible 3D Printed Antenna Using Conductive ABS Materials," by Milad Mirzaee et al., IEEE, Oct. 26, 2015, pp. 1308-1309.

U.S. Appl. No. 16/370,210, filed Mar. 29, 2019, Duncan, et al.
U.S. Appl. No. 16/864,522, filed May 1, 2020, Fedynyshyn, et al.

* cited by examiner

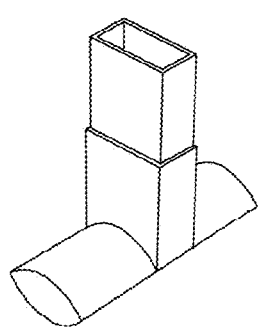
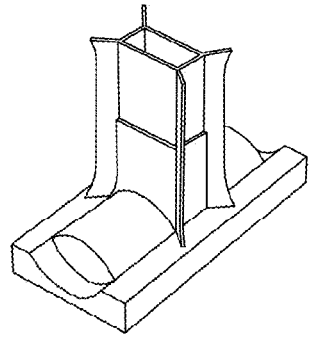
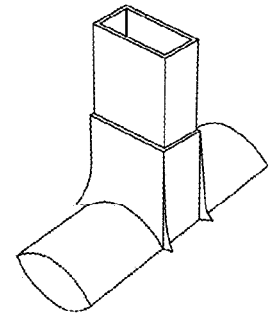
FIG. 8A          FIG. 8B          FIG. 8C
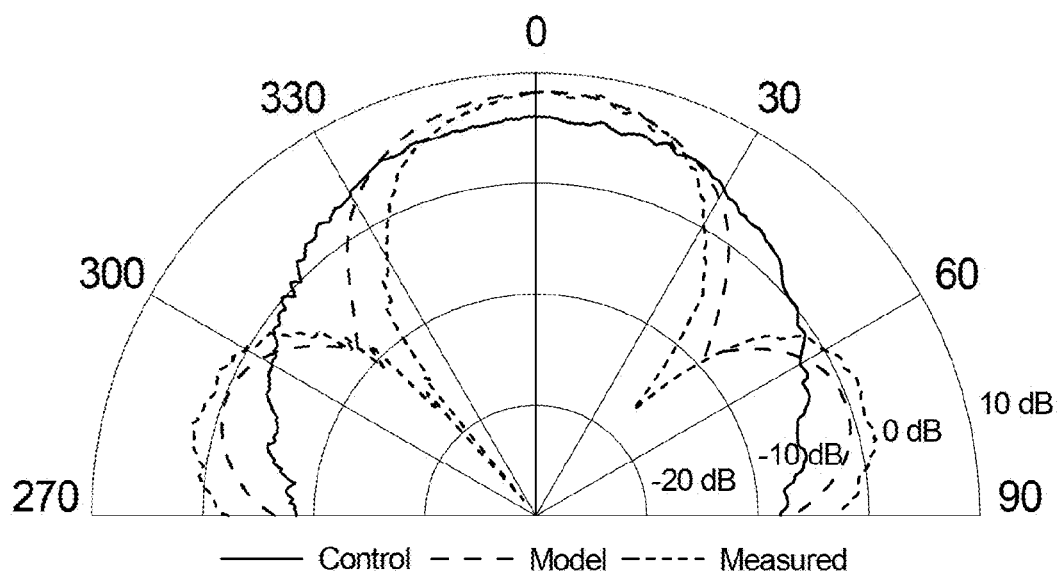
FIG. 8D

BLOCK COPOLYMER INK FORMULATION FOR 3D PRINTING AND METHOD OF MAKING A 3D PRINTED RADIOFREQUENCY (RF) DEVICE

RELATED APPLICATION

This application is the National Stage of International Application Serial No. PCT/US2016/059858, filed Nov. 1, 2016 with the U.S. Patent Office and published in English, which claims the benefit of priority the filing date under 35 U.S.C. § 119(e) of U.S. Provisional Patent Application Ser. No. 62/250,032, filed Nov. 3, 2015, the entire contents of each of which are hereby incorporated herein by reference.

FEDERALLY SPONSORED RESEARCH OR DEVELOPMENT

This invention was made with government support under contract number FA8721-05-C-0002 awarded by the U.S. Air Force. The government has certain rights in the invention.

TECHNICAL FIELD

The present disclosure is related generally to three-dimensional (3D) printing and more particularly to 3D printing of low-loss dielectric structures.

BACKGROUND

The combination of "crowded spectrum" and the requirement for high-bandwidth communications has created a need for communications in the $K_a$ radio frequency (RF) band (26.5-40 GHz). Satellite communications, in particular, are increasingly moving over to this band as lower frequency bands become more crowded. These higher frequency bands also have the advantage of allowing for smaller antenna device and waveguide sizes, which are an advantage for low size, weight and power (SWaP) systems. With these low-SWaP devices, however, comes the need for high precision fabrication methods. Casting and injection molding can create precision parts, but at significant upfront cost and a limited materials selection, with little flexibility for changes in design. Machining can produce high quality, customized designs, but machining the polymeric and ceramic materials used for high-frequency devices can be difficult and laborious. There is a need for a new approach to fabricating low-loss dielectric materials for high-frequency radio devices.

BRIEF SUMMARY

An ink formulation for 3D printing comprises a triblock copolymer in a solvent, where the triblock copolymer includes end blocks comprising an aromatic or acrylate polymer and a midblock between the end blocks comprising an aliphatic polymer. The ink formulation exhibits a shear thinning threshold of about 0.02 rad/sec or less.

A method of making a 3D printed radiofrequency (RF) device comprises extruding an ink formulation from a deposition nozzle moving relative to a substrate, where the ink formulation comprises a triblock copolymer in a solvent and the triblock copolymer includes end blocks comprising an aromatic or acrylate polymer and a midblock between the end blocks comprising an aliphatic polymer. One or more continuous filaments comprising the ink formulation are deposited in a predetermined pattern on the substrate, and the ink formulation is treated to remove or cure the solvent, thereby forming a 3D printed RF device.

A 3D printed radiofrequency (RF) device includes a printed dielectric body comprising a triblock copolymer having end blocks comprising an aromatic or acrylate polymer and a midblock between the end blocks comprising an aliphatic polymer. The printed dielectric body comprises a dielectric loss tangent ($\varepsilon''/\varepsilon'$) of less than about 0.005.

BRIEF DESCRIPTION OF THE DRAWINGS

FIG. 8A shows a rendered design of an antenna to be fabricated by 3D printing.

FIG. 8B shows the as-printed antenna, which is formed on a concave curved substrate and which includes sacrificial "wings" along the edges of the rectangular barrel to avoid shrinkage and curling of the corners.

FIG. 8C shows the antenna after removal from the curved substrate and trimming of the sacrificial wings.

FIG. 8D shows the simulated and experimental output (dashed and solid lines, respectively) of the 3D printed antenna of FIG. 8C.

DETAILED DESCRIPTION

In this work, triblock copolymers are employed to prepare solvent-based ink formulations that can be 3D printed from microscale nozzles at room temperature. The high-resolution 3D printing of triblock copolymers is an enabling technology that can be used to fabricate a number of advanced and novel devices, such as fully integrated GHz to THz radiofrequency (RF) devices, flexible electronics, and microfluidics. As a demonstration of the utility of these printable ink formulations, waveguide resonator filters and a lens have been fabricated and tested. The dielectric properties of 3D-printed structures measured across the $K_a$ band establishes their viability as low-loss dielectric materials.

Figure 1:
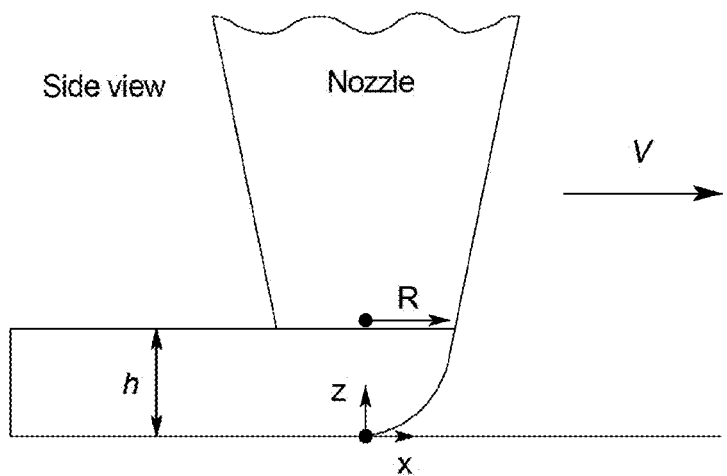
FIG. 1 is a schematic of a continuous filament formed by extrusion-based 3D printing.

FIG. 1 shows a schematic of an exemplary 3D printing process, which may also be referred to as direct ink writing or solvent cast printing. Ink formulations that are suitable for 3D printing can be readily extruded through a deposition nozzle to form a continuous filament that maintains its shape once deposited. As shown in FIG. 1, the deposited filament may have a sufficient stiffness to retain its shape and a height h. During printing, the deposition nozzle can be moved at a constant or variable print speed V while the substrate remains stationary. Alternatively, the substrate may be moved while the deposition nozzle remains stationary, or both the deposition nozzle and the substrate may be moved. One or more continuous filaments can be deposited on the substrate in a predetermined 2D or 3D pattern. Using this approach, 3D structures having a wide range of geometries may be built up layer by layer. The substrate is typically a solid, but 3D printing may alternatively be carried out using a gel or viscous liquid as a substrate.

Advantageously, the solvent-based ink formulation is viscoelastic with a strain-rate dependent viscosity. More specifically, the ink formulation may be shear-thinning, a characteristic that provides low viscosity at high shear rates (e.g., while passing through the deposition nozzle) and high viscosity at low shear rates (e.g., when deposited). Due to evaporation or crosslinking of the solvent post-extrusion, as discussed further below, the stiffness of the deposited filament may increase and a rigid printed structure may be formed. It should be noted that the term "printed structure" is used interchangeably with "printed body" throughout this disclosure to refer to a three-dimensional object formed in a layer-by-layer process by 3D printing.

This disclosure describes a 3D printable ink formulation comprising a triblock copolymer and a solvent, and a method of printing low loss RF devices. The triblock copolymer includes end blocks comprising a first polymer and a mid-block between the end blocks comprising a second polymer incompatible with the first polymer; thus, a mixture of the first and second polymers undergoes phase separation. The end blocks may include an aromatic or acrylate-based polymer and the mid-block may comprise an aliphatic-based polymer. In order to be suitable for 3D printing, the ink formulation exhibits a shear thinning threshold of about 0.02 rad/s or less, as discussed further below.

In one example, the end blocks of the triblock copolymer may comprise an aromatic polymer such as polystyrene and/or a derivative of polystyrene, which is known to be a low-loss dielectric material. Alternatively, an acrylate or methacrylate-based polymer may be employed for the end blocks. The mid-block may comprise any aliphatic-based polymer or substituted aliphatic-based polymer, such as polybutadiene, polyisoprene, poly(ethylene-ran-butylene), a polybutadiene derivative, a polyisoprene derivative, or a poly(ethylene-ran-butylene) derivative, all of which have properties suitable for RF applications.

The triblock copolymer may be selected from among the following: polystyrene block-polybutadiene block-polystyrene block (SBS), polystyrene block-polyethylene-ran-polybutylene block-polystyrene block (SEBS), and polystyrene block-polyisoprene block-polystyrene block (SIS).

A suitable ink formulation may be formed using any of a wide range of molecular weights of the block copolymer. Typically, the molecular weight is between about 10,000 Daltons (10 kDa) and about 10,000,000 Daltons (10,000 kDa). The molecular weight may also be between about 25,000 (25 kDa) and about 1,000,000 Daltons (1,000 kDa). Table 1 below provides a listing of polymers and triblock copolymers used for a number of exemplary ink formulations, along with the molecular weight Mw and molecular weight distribution or dispersity (Ð) of each polymer/copolymer. In these examples, the molecular weight is between 50 kDa and 2,000 kDa.

TABLE 1

Polymers Employed in Exemplary Ink Formulations

| ID | Polymer | Polystyrene (%) | Vendor/Product Number | Mw (kDa) | GPC Ð |
|---|---|---|---|---|---|
| PS1 | Polystyrene | 100 | Aldrich 331651 | 59 | 1.96 |
| PS2 | Polystyrene | 100 | Aldrich 430102 | 109 | 1.57 |
| PS3 | Polystyrene | 100 | Pressure Chemical | 1921 | 1.26 |
| SBS-1 | SBS | 30 | Aldrich 432490 | 69 | 1.21 |
| SBS-2 | SBS | 30 | Aldrich 182877 | 94 | 1.15 |
| SEBS-1 | SEBS | 29 | Aldrich 200565 | 64 | 1.08 |
| SEBS-2 | SEBS | 29 | Aldrich 200557 | 78 | 1.08 |
| SIS-1 | SIS | 14 | Aldrich 432393 | 128 | 1.11 |
| SIS-2 | SIS | 17 | Aldrich 432407 | 99 | 1.14 |
| SIS-3 | SIS | 22 | Aldrich 432415 | 120 | 1.10 |

Table 1 also indicates the percentage of polystyrene in the exemplary polymers. For the triblock copolymers, this percentage is obtained from the ratio of the polystyrene end blocks to the aliphatic polymer mid-block. While any non-zero ratio of (total) polystyrene end block to aliphatic polymer mid-block may be acceptable, the ratio is typically in the range of about 10% to about 50% and may also be in the range from about 14% to about 30%.

The viscosity and flow properties of the ink formulation may be influenced by the molecular weight of the block copolymer as well as the amount or concentration of the block copolymer dissolved in the solvent. Typically, the concentration of the block copolymer in the ink formulation is at least about 10 wt. % and may be at least about 25 wt. %. High copolymer concentrations of at least about 30 or 40 wt. % and up to about 70 or 90 wt. % may be advantageous, since having an excessive amount of solvent may lead to undesirable shrinkage during solvent evaporation. Tables 2 and 3 present a listing of exemplary ink formulations prepared for this work that have triblock copolymer concentrations ranging from 10 wt. % to 60 wt. %.

Suitable solvents for the ink formulation include organic solvents that are capable of solubilizing the triblock copolymer (as well as any other polymer(s) that may be added to the ink formulation). A solvent can be used alone, or a mixture of two or more solvents may be employed. The term "solvent," as used in this disclosure, may refer to both single-component solvents and solvent mixtures. The solvent may be used in an amount of from 1 to 100 times by weight relative to the total solids content of the ink composition. Typically, the polymer-to-solvent ratio is at least about 0.2, at least about 0.4, at least about 0.6, at least about 0.8, or at least about 1 and may be as high as about 4, as high as about 6, or as high as about 9. Preferably, the polymer-to-solvent ratio is from about 0.6 to about 4.

The solvent may comprise an aromatic solvent such as benzene, toluene, xylene, ethylbenzene and/or dimethylbenzene, or another substituted or unsubstituted aromatic solvent. In some cases the solvent may comprise a vinyl-containing monomer, such as an aromatic vinyl-containing monomer selected from among 4-benzhydrylstyrene, 4-tert-butylstyrene, 2,4-dimethylstyrene, 2,5-dimethylstyrene, 2,4-diphenyl-4-methyl-1-pentene, 2-methylstyrene, 3-methylstyrene, 4-methylstyrene, α-methylstyrene, 2,3,4,5,6-pentafluorostyrene, styrene, 2,4,6-trimethylstyrene, 9-vinylanthracene, 4-vinylbenzocyclobutene, 4-vinylbiphenyl, 2-vinylnaphthalene and 2-vinylnaphthalene. The solvent may include a crosslinking agent in addition to the vinyl-containing monomer to promote crosslinking after printing; examples include o-divinylbenzene, m-divinylbenzene and/or p-divinylbenzene. Other suitable solvents may include cellosolve-type solvents such as methyl cellosolve, ethyl cellosolve, methyl cellosolve acetate and ethyl cellosolve acetate. Ethylene glycol-based solvents such as ethylene glycol monomethyl ether, diethylene glycol monomethyl ether, diethylene glycol dibutyl ether, diethylene glycol and diethylene glycol dimethyl ether may also be suitable. Further, a propylene glycol-based solvent such as propylene glycol monoethyl ether, propylene glycol monobutyl ether, propylene glycol monomethyl ether acetate, dipropylene glycol dimethyl ether or propylene glycol monoethyl ether acetate can be used. Suitable ester-type solvents may include butyl acetate, amyl acetate, ethyl butyrate, butyl butyrate, diethyl oxalate, ethyl pyruvate, ethyl-2-hydroxybutyrate, 2-methylacetoacetate, methyl lactate or ethyl lactate. Alternatively, an alcohol such as heptanol, hexanol, nonanol, diacetone alcohol or furfuryl alcohol may be used. Examples of suitable ketone solvents include cyclohexanone or methylamyl ketone. Ethers useful as solvating agents include methyl phenyl ether or diethylene glycol dimethyl ether. Polar solvents, such as dimethylformamide or N-methylpyrrolidone, can also be used.

TABLE 2

Composition of Exemplary Ink Formulations (with Aromatic Solvents)

| Ink # | Polymer 1 | Parts | Polymer 2* | Parts | Solvent | Parts |
|---|---|---|---|---|---|---|
| 1 | PS-1 | 80 | | | Toluene | 20 |
| 2 | PS-2 | 60 | | | Toluene | 40 |
| 3 | PS-2 | 70 | | | Toluene | 30 |
| 4 | PS-3 | 30 | | | Toluene | 70 |
| 5 | PS-3 | 40 | | | Toluene | 60 |
| 6 | SBS-1 | 50 | | | Toluene | 50 |
| 7 | SBS-1 | 55 | | | Toluene | 45 |
| 8 | SBS-1 | 58 | | | Toluene | 42 |
| 9 | SBS-2 | 45 | | | Toluene | 55 |
| 10 | SBS-2 | 50 | | | Toluene | 50 |
| 11 | SBS-1 | 50 | | | Xylenes | 50 |
| 12 | SBS-1 | 55 | | | Xylenes | 45 |
| 13 | SEBS-1 | 45 | | | Toluene | 55 |
| 14 | SEBS-1 | 50 | | | Toluene | 50 |
| 15 | SEBS-2 | 35 | | | Toluene | 65 |
| 16 | SEBS-2 | 40 | | | Toluene | 60 |
| 17 | SEBS-1 | 43 | | | Xylenes | 57 |
| 18 | SEBS-1 | 45 | | | Xylenes | 55 |
| 19 | SEBS-1 | 47 | | | Xylenes | 53 |
| 20 | SEBS-1 | 50 | | | Xylenes | 50 |
| 22 | SIS-1 | 60 | | | Toluene | 40 |
| 24 | SIS-3 | 50 | | | Toluene | 50 |
| 25 | SIS-3 | 55 | | | Toluene | 45 |
| 26 | SIS-3 | 60 | | | Toluene | 40 |
| 27 | SIS-3 | 50 | | | Xylenes | 50 |
| 28 | SIS-3 | 55 | | | Xylenes | 45 |
| 29 | SBS-1 | 30 | PS-1 | 30 | Toluene | 40 |
| 30 | SBS-1 | 40 | PS-1 | 20 | Toluene | 40 |
| 31 | SBS-1 | 40 | PS-1 | 30 | Toluene | 30 |
| 32 | SBS-1 | 50 | PS-1 | 30 | Toluene | 20 |
| 33 | SBS-1 | 10 | PS-2 | 50 | Toluene | 40 |
| 34 | SBS-1 | 20 | PS-2 | 40 | Toluene | 40 |
| 35 | SBS-1 | 30 | PS-2 | 30 | Toluene | 40 |
| 36 | SBS-1 | 40 | PS-2 | 20 | Toluene | 40 |
| 37 | SEBS-1 | 20 | PS-2 | 30 | Toluene | 50 |
| 38 | SEBS-1 | 30 | PS-2 | 20 | Toluene | 50 |

*Optional

TABLE 3

Composition of Exemplary Ink Formulations (with Vinyl-Based Monomer Solvents)

| Ink # | Polymer 1 | Parts | Initiator | Parts | Solvent 1 | Parts | Solvent 2 | Parts |
|---|---|---|---|---|---|---|---|---|
| 39 | SBS-1 | 57 | IRG 819 | 0.43 | Styrene | 38.27 | DVB | 4.3 |
| 40 | SBS-1 | 57 | IRG 819 | 0.86 | Styrene | 38.84 | DVB | 4.3 |
| 41 | SBS-1 | 57 | IRG 819 | 0.86 | Styrene | 33.54 | DVB | 8.6 |
| 42 | SEBS-1 | 43 | IRG 819 | 1.14 | Styrene | 50.16 | DVB | 5.7 |
| 43 | SIS-3 | 52 | IRG 819 | 0.91 | Styrene | 42.24 | DVB | 4.8 |

Figure 2A:
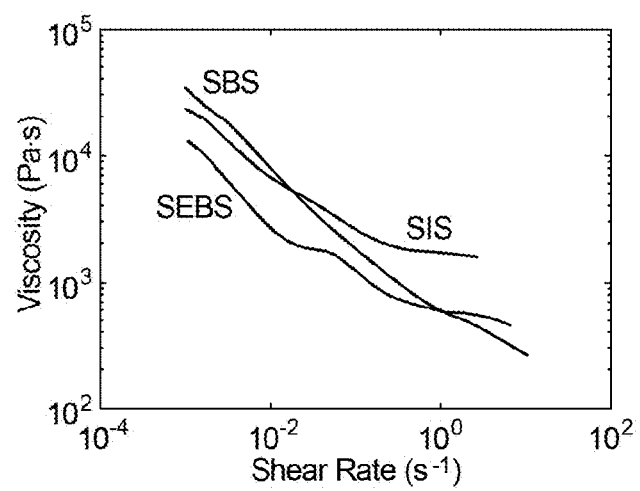
FIG. 2A shows viscosity as a function of shear rate for three exemplary ink formulations based on triblock copolymers.
Figure 2B:
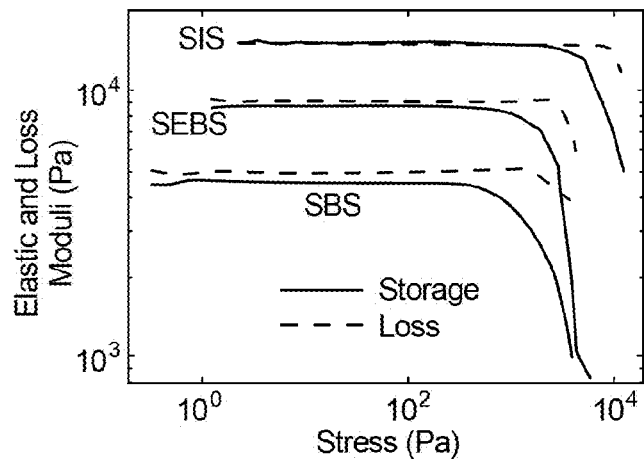
FIG. 2B shows elastic and loss moduli as a function of stress for three exemplary ink formulations based on triblock copolymers.

FIGS. 2A and 2B show the rheological properties of three exemplary ink formulations that include SBS, SEBS and SIS triblock copolymers in aromatic solvents, specifically 55 wt. % SBS in toluene (Ink #7), 45 wt. % SEBS in xylenes (Ink #18) and 55 wt. % SIS in toluene (Ink #25). Shear thinning rheology is demonstrated by measuring viscosity over a wide range of steady shear rates. As can be observed in FIG. 2A, viscosity decreases as a function of shear rate for all three ink formulations. The nearly two orders of magnitude drop in viscosity over the measured range suggests that the ink formulations are highly shear-thinning and well-suited for extrusion-based 3D printing.

Shear storage moduli (G') and loss moduli (G") are shown as a function of stress in FIG. 2B (solid and dashed lines, respectively). The drop-offs in modulus values mark the yield stress of the ink formulations. In this work, yield stress is defined as the point at which the value of the storage modulus drops to 90% of the plateau value. All of the G'/G" ratios are near 1 and yield stresses of 784 Pa, 2070 Pa and 1072 Pa are obtained for the SBS, SIS and SEBS ink formulations, respectively. These values are high enough to allow the extruded filaments to support their own weight during printing and permit layer-by-layer fabrication. Generally speaking, yield stress values of at least about 500 Pa are desired for the ink formulations.

Figure 3A:
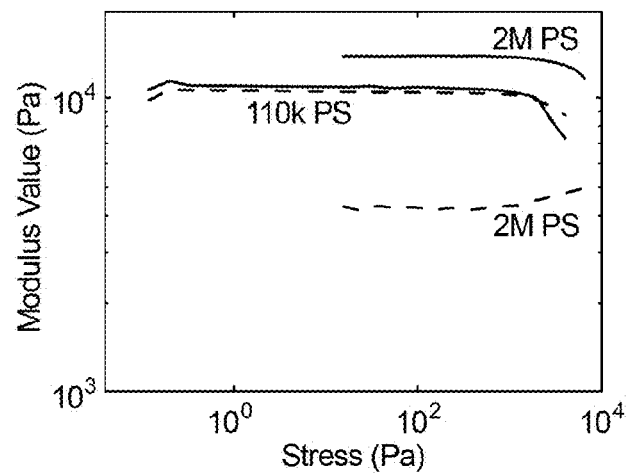
FIG. 3A shows modulus as a function of stress for exemplary polystyrene-based ink formulations.
Figure 3B:
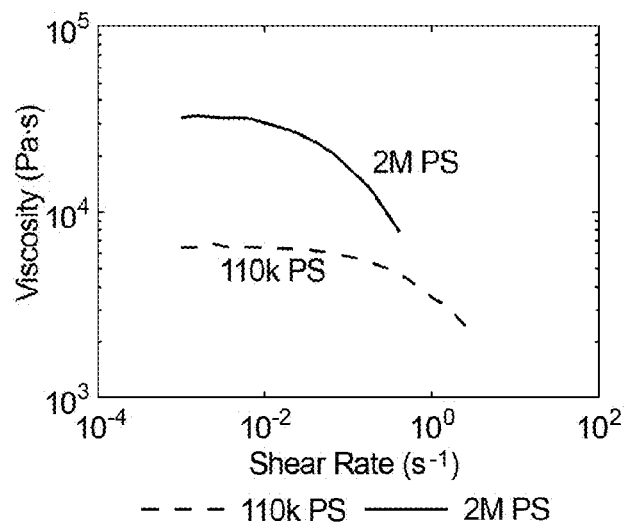
FIG. 3B shows viscosity as a function of shear rate for exemplary polystyrene-based ink formulations.

For comparison, the rheological properties of exemplary polystyrene (PS) ink formulations (Inks #2 and #5) in toluene are shown in FIGS. 3A and 3B. FIG. 3A shows shear storage and loss moduli (solid and dashed lines, respectively) of the PS ink formulations under amplitude modulated oscillatory shear. The drop-offs in modulus values mark the yield stress values of the ink formulations. FIG. 3B shows the viscosities of the PS ink formulations under continuous shear flow. The PS ink formulations exhibit sufficient modulus and yield properties, but inferior shear thinning properties compared to the triblock copolymer ink formulations. The data show that the PS ink formulations exhibit largely Newtonian flow behavior until high shear rates.

Additional data compiled in Table 4 reveal the shear thinning threshold and shear thinning region slope (log η/log γ') for each of the ink formulations investigated. The shear thinning threshold may be determined from viscosity versus shear rate data as the point at which the viscosity decreases more than 20% below an initial plateau region. If there is no initial plateau region, the shear thinning threshold may be determined from the point at which the viscosity decreases more than 20% below the viscosity at the lowest measured shear rate. The shear thinning region slope (log η/log γ') can be determined as the ratio of the logarithm base 10 of measured viscosity η to the logarithm base 10 of the shear rate γ', which corresponds to for example the slope of the data presented in FIG. 2A. Experiments show that ink formulations having a shear thinning threshold of about 0.02 rad/s or less can be successfully employed for extrusion-based 3D printing at room temperature. Advantageously, the shear thinning threshold is about 0.01 rad/s or less, and may be significantly lower (about 0.001 or less). In general, suitable ink formulations have shear-thinning thresholds in the range from greater than zero to about 0.02 rad/s, or from greater than zero to about 0.01 rad/s. Suitable ink formulations for 3D printing may also have a thinning region slope (log η/log γ') of about −0.25 or less, and the thinning region slope (log η/log γ') may be as low as about −1. Ink formulations exhibiting slope values that are too shallow may be too viscous to easily extrude through a fine nozzle.

Ink formulations based on the triblock copolymers (SBS, SEBS and SIS) have a thinning threshold that is well below 0.02 rad/s for a variety of molecular weights, monomer ratios, and polymer-to-solvent ratios. In contrast, polystyrene is not expected to be a good material for 3D printing as its thinning threshold is well above 0.02 rad/s for a variety of molecular weights.

TABLE 4

Rheological Properties of Exemplary Ink Formulations

| Ink # | Polymer 1 | Polymer 2 | Thinning Threshold (rad/s) | Thinning Region (log(η)/log(γ')) |
|---|---|---|---|---|
| 1 | PS-1 | | 1.0 | −0.183 |
| 2 | PS-2 | | 2.5 | −0.534 |
| 3 | PS-2 | | 0.4 | −0.368 |
| 4 | PS-3 | | 0.6 | −0.779 |
| 5 | PS-3 | | 0.04 | −0.238 |
| 6 | SBS-1 | | 0.01 | −0.660 |
| 7 | SBS-1 | | <0.001 | −0.539 |
| 8 | SBS-1 | | 0.016 | −0.706 |
| 9 | SBS-2 | | 0.001 | −0.308 |
| 10 | SBS-2 | | <0.001 | −0.283 |
| 11 | SBS-1 | | <0.001 | −0.608 |
| 12 | SBS-1 | | <0.001 | −0.860 |
| 13 | SEBS-1 | | <0.001 | −0.390 |
| 14 | SEBS-1 | | <0.001 | −0.427 |
| 15 | SEBS-2 | | <0.001 | −0.523 |
| 16 | SEBS-2 | | <0.001 | −0.438 |
| 18 | SEBS-1 | | <0.001 | −0.369 |
| 20 | SEBS-1 | | <0.001 | −0.289 |
| 22 | SIS-1 | | 0.1 | −0.140 |
| 24 | SIS-3 | | 0.002 | −0.470 |
| 25 | SIS-3 | | <0.001 | −0.330 |
| 26 | SIS-3 | | 0.004 | −1.102 |
| 27 | SIS-3 | | <0.001 | −0.306 |
| 28 | SIS-3 | | <0.001 | −0.255 |
| 29 | SBS-1 | PS-1 | <0.001 | −0.478 |
| 30 | SBS-1 | PS-1 | <0.001 | −0.456 |
| 31 | SBS-1 | PS-1 | <0.001 | −0.410 |
| 32 | SBS-1 | PS-1 | <0.001 | −0.383 |
| 33 | SBS-1 | PS-2 | 0.004 | −0.221 |
| 34 | SBS-1 | PS-2 | 0.0015 | −0.618 |
| 35 | SBS-1 | PS-2 | 0.003 | −0.734 |
| 36 | SBS-1 | PS-2 | 0.003 | −0.759 |
| 37 | SEBS-1 | PS-2 | 0.0015 | −0.574 |
| 38 | SEBS-1 | PS-2 | <0.001 | −0.513 |
| 39 | SBS-1 | | <0.001 | −0.520 |
| 40 | SBS-1 | | <0.001 | −0.329 |
| 41 | SBS-1 | | <0.001 | −0.469 |
| 42 | SEBS-1 | | <0.001 | −0.492 |
| 43 | SIS-3 | | <0.001 | −0.301 |

Figure 4A:
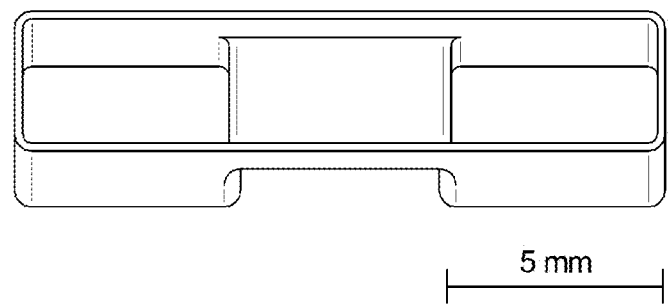
FIG. 4A shows an exemplary 3D printed bridge structure fabricated from a triblock copolymer-based ink formulation.
Figure 4B:
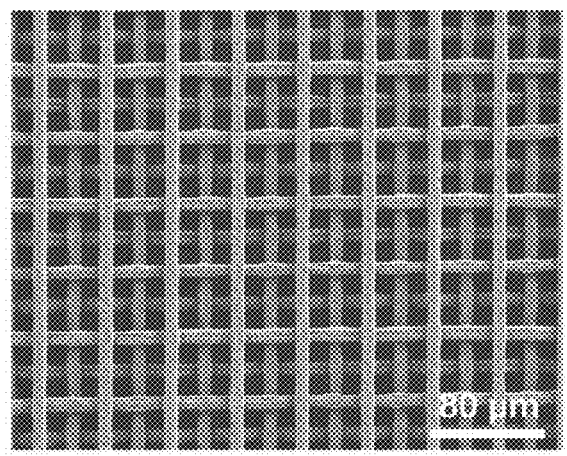
FIG. 4B shows an exemplary 3D printed logpile structure (top view) fabricated from a triblock copolymer-based ink formulation.

Immediately after printing, the deposited filament may be soft and tacky, although stiff enough to hold its shape. The stiffness of the as-printed filaments is high enough that unsupported regions of filaments or printed structures can be formed. For example, a 5 mm-long suspended bridge structure printed using a 200 μm-diameter nozzle from Ink #7 is shown in FIG. 4A. The outer skin of the printed structure quickly hardens, although full drying of the structure can take hours or days, depending on sample thickness and drying conditions. FIG. 4B shows a face-centered cubic (FCC) woodpile structure printed from Ink #17 using a 10 μm-diameter nozzle. The slightly reduced solids content of Ink #17 compared to Ink #18 (from 45 wt. % to 43 wt. %) allows for the printing of smoother features at this resolution. The deposited filaments that make up the woodpile structure have a high surface area to volume ratio, which promotes rapid drying.

Solvent evaporation may lead to anisotropic shrinkage, particularly in the case of thicker (e.g., multilayer) printed structures or bodies. To ameliorate these effects, the aromatic solvents may be replaced with a curable vinyl-containing monomer or mixture of vinyl-containing monomers, as mentioned above. A UV photoinitiator may also be employed in the ink formulation to effect curing. For example, the ink formulation may include styrene and divinylbenzene (monomers) and Irgacure 819 (UV photoinitiator). Exemplary ink formulations including these monomers are listed in Table 3 and may be referred to as X-SBS (crosslinked styrene-butadiene-styrene) and X-SIS (crosslinked styrene-isoprene-styrene). The replacement of the aromatic solvents with the monomers does not have a detrimental effect on the rheological properties, as shown by the data in Table 3. To polymerize the ink immediately following printing, two fiber optic cables, connected to a UV lightbox, may be coupled to the deposition nozzle.

Figure 5:
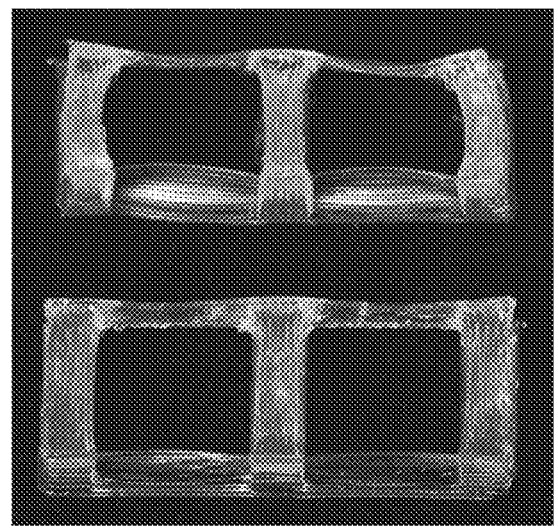
FIG. 5 shows two exemplary 3D printed dielectric structures fabricated from a triblock copolymer-based ink formulation comprising: (top structure) an aromatic solvent; and (bottom structure) vinyl-containing monomers which form crosslinked polystyrene after UV light exposure; it can be observed that the top printed structure exhibits significantly more shrinkage than the bottom structure due to evaporation of the solvent.

This printing process yields solid structures with noticeably reduced shrinkage, as can be observed by comparing, in FIG. 5, the top printed structure (formed from SEBS Ink #18) with the bottom printed structure (formed from X-SBS Ink #40). While the printed structure formed from Ink #18 experienced some shape changes due to solvent evaporation, the printed structure formed from Ink #40 largely retained the as-printed shape.

The ink formulation may include, in addition to the triblock copolymer and solvent, one or more additives to enhance the flow properties and/or to improve the properties of the printed structure. Exemplary additives may include organic or inorganic solids (filler particles), additional polymer(s), surfactant, stabilizer, sensitizer, dye, colorant, and ultraviolet radiation absorber. A free radical generator may be included in the ink formulation when a vinyl-containing monomer is employed as the solvent, as discussed below.

Organic or inorganic solids (filler particles) may be added to the ink formulation in any amount that does not interfere with printing and/or undesirably limit light penetration in the material. The incorporation of filler particles may improve the structural or aesthetic properties of the printed structure. In addition, depending on the properties of the filler particles, it may be possible to tailor the dielectric constant of the printed structure to a desired value.

Advantageously, the solids are dielectric filler particles having a low RF loss. Preferred dielectric filler particles exhibit a dielectric constant greater than about 2 and may be selected from the following: aluminum oxide, boron nitride, beryllium oxide, magnesium oxide, magnesium titanate, titanium dioxide, strontium titanate, barium titanate, molybdenum sulfide, zinc oxide, magnesium carbonate, borosilicate glass, mica, sapphire, fused silica, fused quartz, steatite, soda-line glass, zirconia, and wollastonite. The dielectric filler particles used in the exemplary ink formulations described below include magnesium oxide, aluminum oxide, titanium dioxide or strontium titanate.

Other suitable filler particles may include aluminum nitride, antimony oxide, barium oxide, barium carbonate, boron silicide, bismuth oxide, cadmium sulfide, calcium carbonate, cerium oxide, calcium boride, copper oxide, copper sulfide, cobalt oxide, chromium carbide, chromium nitride, dysprosium oxide, europium oxide, iron oxide, indium oxide, indium tin oxide, hafnium oxide, hafnium carbide, hafnium boride, hafnium silicide, gadolinium oxide, lanthanum oxide, lanthanum boride, lanthanum fluoride, manganese oxide, manganese carbonate, manganese nitride, molybdenum oxide, molybdenum carbide, molybdenum sulfide, neodymium oxide, niobium carbide, nickel oxide, praseodymium oxide, silicon dioxide, titanium oxide, titanium silicide, titanium nitride, titanium boride, tin oxide, terbium oxide, tungsten carbide, tungsten oxide, tungsten sulfide, tantalum carbide, silicon carbide, silicon nitride, strontium carbonate, yttrium oxide, vanadium carbide, zinc carbonate, zinc oxide, zirconium boride, zirconium carbide, zirconium sulfide, zirconium silicide, zirconium nitride, zirconium oxide, carbon black and/or talc. It is well know that metal oxides can exist with different oxidation states of the metal and all oxidation states of the metal may be suitable.

The filler particles may have an average particle size in the range from about 1 nm to about 10 microns, and is more typically in the range from about 5 nm to about 500 nm. Thus, the filler particles may be referred to as nanoparticles in some cases. The average particle size may be understood to refer to an average primary particle size or crystallite size. The average size of the filler particles may be determined using any of the number of characterization techniques known in the art, such as x-ray diffraction or transmission electron microscopy.

Table 5 below provides exemplary ink formulations that include, in addition to the triblock copolymer (SBS, SEBS or SIS), dielectric filler particles selected from aluminum oxide, titanium dioxide and strontium titanate. Typically, the dielectric filler particles are present in the ink formulation at a concentration of at least about 20 wt. %, and the examples of Table 5 show concentrations ranging from 20 wt. % to 60 wt. %. When dielectric filler particles are incorporated into the ink formulation, the triblock copolymer is typically present at a concentration of at least about 20 wt. %.

TABLE 5

Composition of Exemplary Ink Formulations (With Dielectric Filler Particles)

| Ink # | Polymer | Parts | Particle | Parts | Solvent | Parts |
|---|---|---|---|---|---|---|
| 39 | SBS-1 | 36 | $Al_2O_3$ | 20 | Toluene | 44 |
| 40 | SBS-1 | 22.5 | $Al_2O_3$ | 50 | Toluene | 27.5 |
| 41 | SBS-1 | 40 | $Al_2O_3$ | 20 | Toluene | 40 |
| 42 | SBS-1 | 35 | $Al_2O_3$ | 30 | Toluene | 35 |
| 43 | SBS-1 | 30 | $Al_2O_3$ | 40 | Toluene | 30 |
| 44 | SBS-1 | 25 | $Al_2O_3$ | 50 | Toluene | 25 |
| 45 | SBS-1 | 20 | $Al_2O_3$ | 60 | Toluene | 20 |
| 46 | SBS-1 | 44 | $Al_2O_3$ | 20 | Toluene | 36 |
| 47 | SBS-1 | 27.5 | $Al_2O_3$ | 50 | Toluene | 22.5 |
| 48 | SBS-1 | 48 | $Al_2O_3$ | 20 | Toluene | 32 |
| 49 | SBS-1 | 30 | $Al_2O_3$ | 50 | Toluene | 20 |
| 52 | SEBS-1 | 20 | $Al_2O_3$ | 50 | Xylenes | 30 |
| 53 | SEBS-1 | 40.5 | $Al_2O_3$ | 10 | Xylenes | 49.5 |
| 54 | SEBS-1 | 36 | $Al_2O_3$ | 20 | Xylenes | 44 |
| 55 | SEBS-1 | 31.5 | $Al_2O_3$ | 30 | Xylenes | 38.5 |
| 56 | SEBS-1 | 27 | $Al_2O_3$ | 40 | Xylenes | 33 |
| 58 | SIS-3 | 22.5 | $Al_2O_3$ | 50 | Toluene | 27.5 |
| 59 | SIS-3 | 45 | $Al_2O_3$ | 10 | Toluene | 45 |
| 60 | SIS-3 | 40 | $Al_2O_3$ | 20 | Toluene | 40 |
| 61 | SIS-3 | 35 | $Al_2O_3$ | 30 | Toluene | 35 |
| 62 | SIS-3 | 30 | $Al_2O_3$ | 40 | Toluene | 30 |
| 63 | SIS-3 | 44 | $Al_2O_3$ | 20 | Toluene | 36 |
| 64 | SIS-3 | 27.5 | $Al_2O_3$ | 50 | Toluene | 22.5 |
| 65 | SIS-3 | 48 | $Al_2O_3$ | 20 | Toluene | 32 |
| 66 | SIS-3 | 30 | $Al_2O_3$ | 50 | Toluene | 20 |
| 67 | SIS-3 | 20 | $Al_2O_3$ | 60 | Toluene | 20 |
| 68 | SIS-3 | 33 | $Al_2O_3$ | 40 | Toluene | 27 |
| 69 | SIS-3 | 25 | $Al_2O_3$ | 50 | Toluene | 25 |
| 70 | SIS-3 | 23.75 | $TiO_2$ | 47.5 | Toluene | 28.75 |
| 71 | SIS-3 | 43 | $TiO_2$ | 21.5 | Toluene | 35.5 |
| 72 | SIS-3 | 31.5 | $TiO_2$ | 31.5 | Toluene | 37 |
| 73 | SIS-3 | 22.5 | $TiO_2$ | 45 | Toluene | 32.5 |
| 74 | SIS-3 | 51 | $TiO_2$ | 17 | Toluene | 32 |
| 75 | SIS-3 | 20 | $TiO_2$ | 40 | Toluene | 20 |
| 76 | SIS-3 | 23.75 | $TiO_2$ | 47.5 | Toluene | 28.75 |
| 77 | SIS-3 | 37.5 | $SrTiO_3$ | 25 | Toluene | 37.5 |
| 78 | SIS-3 | 25 | $SrTiO_3$ | 50 | Toluene | 25 |
| 79 | SIS-3 | 30 | $SrTiO_3$ | 40 | Toluene | 30 |

The data in Table 6 show that all of the ink formulations containing aluminum oxide, titanium dioxide or strontium titanate and any of the three triblock copolymers have a thinning threshold that is well below 0.02 rad/s. The thinning region slope for these ink formulations is also well below −0.25. This demonstrates that ink formulations including dielectric filler particles in addition to a triblock copolymer have the correct rheology to undergo shear thinning during solvent-casting 3D printing.

TABLE 6

Rheological Properties of Exemplary Ink Formulations

| Ink # | Polymer | Particle | Thinning Threshold (rad/s) | Thinning Region (log($\eta$)/log($\gamma'$)) |
|---|---|---|---|---|
| 39 | SBS-1 | $Al_2O_3$ | <0.001 | −0.610 |
| 40 | SBS-1 | $Al_2O_3$ | <0.001 | −0.593 |
| 41 | SBS-1 | $Al_2O_3$ | 0.002 | −0.596 |
| 42 | SBS-1 | $Al_2O_3$ | <0.001 | −0.570 |
| 43 | SBS-1 | $Al_2O_3$ | <0.001 | −0.578 |
| 44 | SBS-1 | $Al_2O_3$ | 0.016 | −0.620 |
| 45 | SBS-1 | $Al_2O_3$ | 0.009 | −0.650 |
| 46 | SBS-1 | $Al_2O_3$ | <0.001 | −0.533 |
| 47 | SBS-1 | $Al_2O_3$ | <0.001 | −0.579 |
| 48 | SBS-1 | $Al_2O_3$ | <0.001 | −0.610 |
| 49 | SBS-1 | $Al_2O_3$ | <0.001 | −0.570 |
| 52 | SEBS-1 | $Al_2O_3$ | 0.010 | −0.500 |
| 53 | SEBS-1 | $Al_2O_3$ | <0.001 | −0.637 |
| 54 | SEBS-1 | $Al_2O_3$ | <0.001 | −0.595 |
| 55 | SEBS-1 | $Al_2O_3$ | <0.001 | 0.540 |
| 56 | SEBS-1 | $Al_2O_3$ | <0.001 | −0.537 |
| 58 | SIS-3 | $Al_2O_3$ | <0.001 | −0.310 |
| 59 | SIS-3 | $Al_2O_3$ | <0.001 | −0.614 |

TABLE 6-continued

Rheological Properties of Exemplary Ink Formulations

| Ink # | Polymer | Particle | Thinning Threshold (rad/s) | Thinning Region (log(η)/log(γ')) |
|---|---|---|---|---|
| 60 | SIS-3 | $Al_2O_3$ | <0.001 | −0.541 |
| 61 | SIS-3 | $Al_2O_3$ | <0.001 | −0.564 |
| 62 | SIS-3 | $Al_2O_3$ | <0.001 | −0.520 |
| 63 | SIS-3 | $Al_2O_3$ | <0.001 | −0.660 |
| 64 | SIS-3 | $Al_2O_3$ | <0.001 | −0.810 |
| 65 | SIS-3 | $Al_2O_3$ | <0.001 | −0.610 |
| 66 | SIS-3 | $Al_2O_3$ | <0.001 | −0.630 |
| 67 | SIS-3 | $Al_2O_3$ | <0.001 | −0.650 |
| 70 | SIS-3 | $TiO_2$ | <0.001 | −0.719 |
| 71 | SIS-3 | $TiO_2$ | <0.001 | −0.409 |
| 72 | SIS-3 | $TiO_2$ | <0.001 | −0.450 |
| 73 | SIS-3 | $TiO_2$ | <0.001 | −0.569 |
| 74 | SIS-3 | $TiO_2$ | <0.001 | −0.654 |
| 76 | SIS-3 | $TiO_2$ | 0.004 | −0.593 |
| 77 | SIS-3 | $SrTiO_3$ | <0.001 | −0.342 |
| 78 | SIS-3 | $SrTiO_3$ | <0.001 | −0.991 |
| 79 | SIS-3 | $SrTiO_3$ | <0.001 | −0.407 |

The filler particles may be added directly to the ink formulation or the surface of the particles may first be modified to increase compatibility with the ink formulation. This can be accomplished by attaching a hydrophobic moiety to the surface of the particle through either covalent or ionic attachment or any other means of surface absorption. In one example, alum inic esters may be employed for surface modification. In a second example, titanate, zirconate and/or aluminate coupling agents may be used. A third approach for surface modification is to employ silane coupling agents, such as chlorosilanes or alkoxysilanes. A fourth approach is to use surfactants such as steric acid or lauryl acid. Other approaches known in the art for particle surface modification may also or alternatively be employed so as to increase compatibility with the ink formulation.

As indicated above, the ink formulation may include a second polymer in addition to the triblock copolymer, such as a homopolymer, copolymer, terpolymer or higher polymer. The molecular weight of the second polymer may be between 10,000 Da and 10,000,000 Da and is more typically between 25,000 Da and 1,000,000 Da. Adding a second polymer may allow the rheology of the ink formulation and/or the properties of the 3D printed dielectric structure to be modified. Exemplary second polymers include polyethylenes, polypropylenes, polytetrafluoroethylenes, polystyrenes, poly indenes, polyvinyl acetates, polyvinylalcohols, polyacrylates, polymethacrylates, polyacryonitrile, polyvinyl chloride, polyvinylidine chloride, polyamides, polyesters, epoxy resins, polyformaldehyde resins, amino-formaldehyde resins, phenol-formaldehyde resins, cellulose and cellulose derivatives, proteins, natural rubber, polyisoprene, polybutadiene, polynitrile rubbers, chloroprene rubbers, polyurethanes, and polysilicones.

A sensitizer can be added to the ink formulation to increase the absorbance of the material and/or increase the sensitivity of the material toward photons. Exemplary sensitizers include Anthracure® UVS-1101, UVS-1331 and UVS-1221 from Kawasaki Kasei Chemicals Ltd.

A dye can be added to the ink formulation to increase the absorbance without sensitization of the material. The dye may absorb in the visible part of the spectrum and produce a colored material. Alternatively, the dye may absorb in the non-visible part of the spectrum and be employed to reduce the amount of light penetration in the material; in this case, the dye may limit the depth into the material of crosslinking. An advantage of limiting the depth may be a finer resolution in the depth or z-direction of the voxel.

Suitable surfactants that may be employed in the ink formulation include, for example, nonionic surfactants. Such nonionic surfactants can include polyoxyethylene alkyl ethers such as polyoxyethylene lauryl ether, polyoxyethylene stearyl ether and polyoxyethylene oleyl ether, polyoxyethylene alkylphenyl ethers such as polyoxyethylene octylphenyl ether and polyoxyethylene nonylphenyl ethers. Further, suitable nonionic ester surfactants may include polyethylene glycol dialkyl esters, such as polyethylene glycol dilaurate and polyethylene glycol distearate. Alternatively, fluorine-containing surfactants that include a fluoroalkyl or perfluoroalkyl group can be utilized. Organosiloxane surfactants may also be also suitable for decreasing the surface tension of the ink formulation. Additionally, acrylic acid- or methacrylic acid-type polymers and copolymers may serve as suitable surfactants. Suitable amounts of the surfactant may range from about 0.005 to about 1 part by weight per 100 parts by weight of the ink formulation. In addition, antioxidants or defoaming agents can be included as desired to attenuate the ink formulation.

When the solvent comprises a vinyl-containing monomer, a thermal or photo-induced free radical generator may be included in the ink formulation to crosslink the monomer in the presence of the triblock copolymer. The crosslinking may occur either during or after deposition. The thermal or photo-induced free radical generator may generate free radicals upon exposure to heat or ultraviolet (UV) radiation. Any of a number of known free-radical generators, such as photoinitiators, may be employed. Some examples of suitable commercially-available photoinitiators include Irgacure 184, Irgacure 261, Irgacure 369, Irgacure 379, Irgacure 500, Irgacure 651, Irgacure 727, Irgacure 750, Irgacure 784, Irgacure 819, Irgacure 907, Irgacure 1035, Irgacure 1700, Irgacure 1800, Irgacure 2959, Irgacure OXE01, Darocur 1173, Darocur 4265, Darocur TPO, Darocur BP, CGI 1905 and CGI 263. Exemplary thermal radical generators include 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

An important property of a dielectric material is its electric permittivity, which has both real and imaginary parts that vary with the frequency of the input wave $$\varepsilon(\omega)=\varepsilon'(\omega)-i\varepsilon''(\omega)$$

where $\varepsilon'$ is the dielectric constant, $\varepsilon''$ is the imaginary component, and $\omega$ is the frequency of the alternating electric field. The dielectric constant determines how easily the material polarizes in response to an electric field. This also determines the propagation rate of a wave through the material. Furthermore, the ratio of real and imaginary components gives the loss tangent $\tan(\delta)=\varepsilon''/\varepsilon'$, which allows for the determination of power loss in the dielectric material for a propagating wave.

$$P=P_0 e^{-\tan(\delta)kz}$$

where $P_0$ is the initial power, $k=2\pi/\lambda$ where $\lambda$ is the wave length in the propagating medium, and z is the depth of the sample. A useful dielectric material has a low loss in the desired frequency range.

As a standard comparison, a solid piece of Rexolite 1422, a common low-loss dielectric material, is machined to fit a waveguide, and its dielectric constant and loss are measured. Ink formulations based on the triblock copolymers SEBS, SBS, and SIS are 3D printed by solvent casting followed by drying, thereby forming printed structures having the desired waveguide dimensions which can then be fit into the waveguide. The dielectric properties of the printed structures are summarized in Table 7 and compared with Rexolite as a way of determining the practical viability of the printed structures as low-loss dielectrics at 34 GHz.

TABLE 7

Dielectric Properties of 3D Printed Structures

| Polymer | Dielectric constant $\varepsilon'$ | Loss tangent $\varepsilon''/\varepsilon' \times 10^3$ | Loss relative to Rexolite |
| --- | --- | --- | --- |
| Rexolite | 2.50 | 0.52 | 100% |
| SEBS | 2.52 | 0.45 | 86% |
| SBS | 2.43 | 2.28 | 441% |
| SIS | 2.28 | 1.64 | 317% |
| X-SBS | 2.09 | 2.26 | 437% |
| X-SIS | 2.17 | 1.95 | 378% |

Referring to Table 7, the SBS printed structure had a loss tangent value of $2.28\times10^{-3}$ (0.00228), about 4.4 times that of Rexolite. The SIS printed structure had a slightly lower loss tangent value of $1.64\times10^{-3}$ (0.00164), about 3.2 times the value of Rexolite. The SEBS printed structure had the best loss tangent value, $0.45\times10^{-3}$ (0.00045), even lower than Rexolite. Printed structures formed from ink formulations including a crosslinkable monomer instead of the aromatic solvent show very similar loss values and a similar trend, indicating that there is little difference between the crosslinked and uncrosslinked printed structures from a dielectric properties perspective.

The above measurements of dielectric constants and loss tangents demonstrate that the exemplary 3D printed dielectric bodies can be low loss, viable options for $K_a$ band RF devices. As a next step, two waveguide filter devices and an antenna are 3D printed and characterized to show the versatility of 3D printing for making RF devices that would otherwise be difficult to manufacture.

Figure 6:
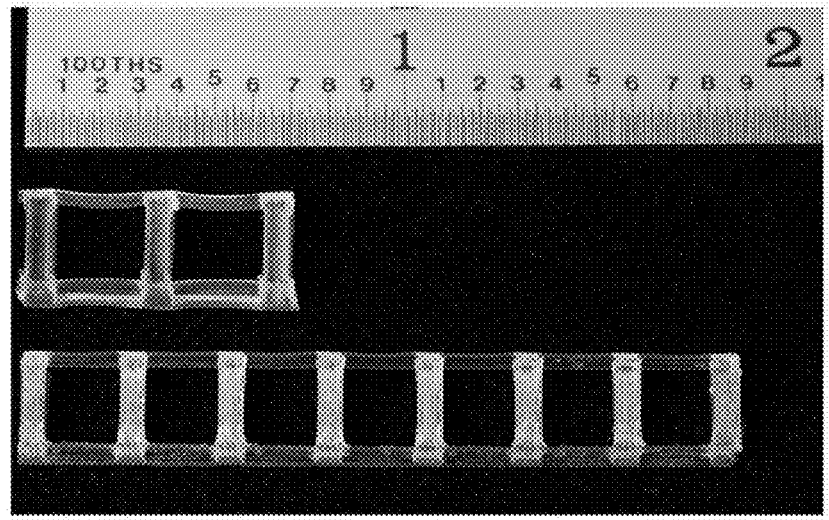
FIG. 6 shows exemplary 3D printed three-stage and eight-stage filter devices next to a ruler to show the scale.
Figure 7A:
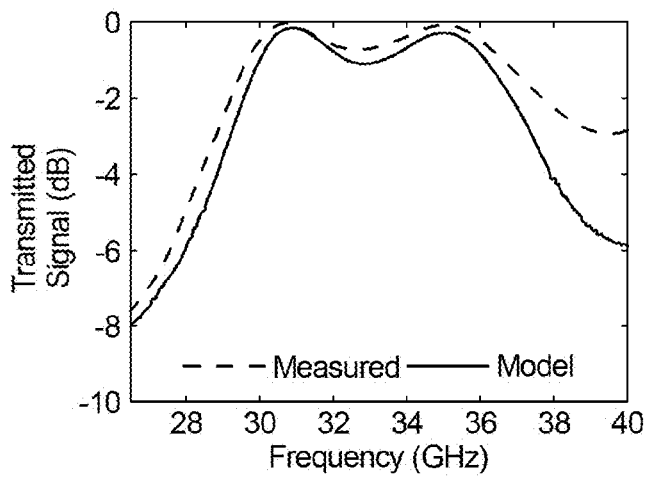
FIG. 7A shows transmission signal as a function of frequency for the three-stage filter device of FIG. 6, including both simulated and experimental results (dashed and solid lines, respectively).

The first exemplary printed device is a three-stage filter shown in FIG. 6 (top). The filter is printed using a SEBS ink formulation with an aromatic solvent; after printing, the solvent is removed. The stages or blocks of the filter act as resonators for the radio waves passing through the sample; thus, the device functions as a band-pass filter that allows signals between 30 GHz and 36 GHz to pass through, but blocks other frequencies. The dotted line of FIG. 7A shows the expected output of the device by finite element analysis simulation. To avoid some of the complications caused by shrinkage due to solvent loss, a five-stage device is printed from the SEBS ink formulation and the outer stages are trimmed off after drying. Much of the curling or shrinkage occurs in the outer stages, and thus their removal after drying leaves a usable device. This structure is then placed inside a rectangular waveguide and the signal transmission and reflectance are both measured across the Ka band.

As can be seen in FIG. 7A, there is good agreement between the expected output of the device and the measured transmission. In both the simulation and the measured data, the center of the high transmission region is at 32.8 GHz. While the simulation shows a −3 dB cutoff at 28.8 GHz and never quite achieves a −3 dB cutoff on the other side, the actual device has a narrower pass band, with −3 dB cut-offs at 29.0 GHz and 37.4 GHz. This demonstration shows that the triblock copolymer ink formulation can be 3D printed into a simple waveguide resonator filter device.

Figure 7B:
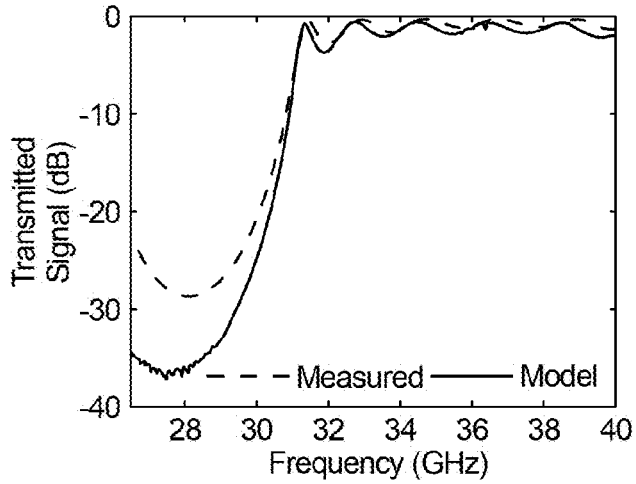
FIG. 7B shows transmission signal as a function of frequency for the eight-stage filter device of FIG. 6, including both simulated and experimental results (dashed and solid lines, respectively).

An X-SBS ink formulation (which includes SBS and a monomer) is then used to print a larger, eight-stage high-pass waveguide filter, as shown in FIG. 6 (bottom). Transmission is measured identically to the three-stage device. As shown in FIG. 7B, there is excellent agreement between the simulated output (dotted line) and actual measurement (solid line). The device has a 3 dB cutoff at about 31.7 GHz, and signal is below −25 dB between 26.5 and 30 GHz. Again, the out of band signal is lower than in the simulation, with a minimum of −36 dB, compared to −29 dB for the simulation. The likeliest explanation for this discrepancy is that the simulation does not fully account for the destructive interference caused by the filter. Since this feature is present in both the three-stage and eight-stage filters, and the finished filters outperform the simulations, it is assumed that the discrepancy can be attributed to the simulation rather than the finished product.

In another demonstration, an antenna meant to fit on the end of a rectangular waveguide is printed. A rendered design of the antenna is shown in FIG. 8A. The antenna includes two components, a curved, cylindrical lens and a rectangular barrel. In this exemplary device, the lens is 20 mm long with a radius of curvature of 4.55 mm and the rectangular barrel is 20 mm in length with a wall of 600 µm in thickness on the bottom half and 400 µm in thickness on the top half. The change in thickness provides a notch to mount the antenna on the end of the waveguide. The complex design of the antenna produces practical challenges for any printing method. Maintaining the curvature of the lens is paramount, as warping and distortion of the lens can lead to an altered refracted image. Furthermore, the rectangular barrel is ideally kept as thin as possible, so as not to alter radio wave transmission before the waves reach the lens. To maintain this high-quality surface, a printing substrate having a curved basin may first be printed using an SLA printer. The curved basin is designed to inversely match the curvature of the lens, so that the lens can be printed directly inside the substrate, as shown in FIG. 8B. To facilitate removal of the antenna from the base, a mold release spray may be used.

The antenna barrel presented an extremely thin, high aspect ratio feature. While the ink formulations are able to support their own weight, any shrinkage at all can cause a distortion of the corners, which can lead to collapse of the barrel during the layer-by-layer deposition process. To prevent rounding of the corners, "wings" that may be trimmed off of the device after printing may be added to the sides of the barrel of the lens, as shown in FIG. 8B. These are used to yield the final antenna device shown in FIG. 8C.

The radiation pattern of the printed antenna is modeled using finite element simulation software HFSS at 30 GHz and can be seen as the dotted line in FIG. 8D. The measured output from the antenna is represented by the solid gray line and is obtained by mounting the lens on the end of a waveguide and measuring the signal output from −90 to 90 degrees in front of the antenna. The black line is the control (i.e., the signal coming out of the waveguide without any antenna mounted). The forward signal is boosted by 2.1 dB over the unaltered signal. The antenna also produces significant side lobes, along interference-driven nulls between the lobes and the center signal. The output of the antenna closely matches the model. There are, however, some minor differences in the angle of the nulls between the measured (±41°) and simulated (±45°) outputs. This is due to small dimensional variations between the printed antenna and the original design. In particular, shrinkage of the SIS ink formulation due to solvent evaporation after printing increases the radius of curvature of the lens slightly, which in turn moves the angle of the nulls slightly inward.

A method of making a printed RF device (such as the above-described waveguide filter or antenna) based on solvent casting or extrusion-based 3D printing has been developed and is described here. The method includes extruding an ink formulation from a deposition nozzle moving relative to a substrate. One or more continuous filaments comprising the ink formulation are deposited in a predetermined pattern on the substrate to form a 3D printed body. The ink formulation comprises a triblock copolymer in a solvent, where the triblock copolymer includes end blocks comprising an aromatic or acrylate polymer and a midblock between the end blocks comprising an aliphatic polymer. The ink formulation is treated to remove or cure the solvent, thereby forming the printed RF device.

The ink formulation employed in the method may have any of the characteristics described in this disclosure. For example, the end blocks of the triblock copolymer may comprise an aromatic polymer such as polystyrene and/or a derivative of polystyrene. The midblock of the triblock copolymer may comprise an aliphatic polymer such as polybutadiene, polyisoprene, poly(ethylene-ran-butylene), a polybutadiene derivative, a polyisoprene derivative, or a poly(ethylene-ran-butylene) derivative. The triblock copolymer may be selected from the group consisting of polystyrene block-polybutadiene block-polystyrene block (SBS), polystyrene block-polyethylene-ran-polybutylene block-polystyrene block (SEBS), and polystyrene block-polyisoprene block-polystyrene block (SIS). The ink formulation may include dielectric filler particles and/or other additives, and any of a number of solvents may be suitable, as described in detail above.

The treatment of the ink formulation may entail drying, heating and/or exposure to UV radiation in order to remove (e.g., evaporate) or cure (e.g., crosslink) the solvent. In one example, the ink formulation may be heated to a temperature from about 70° C. to about 200° C. to induce evaporation or promote crosslinking of the solvent. In another example, the ink formulation may be treated by exposure to UV radiation having a wavelength between 150 nm and 500 nm to induce curing. A thermal or photo-induced free radical generator may be included in the ink formulation to crosslink the monomer in the presence of the triblock copolymer. The inclusion of a photoacid or thermal acid generator may allow for acid-catalyzed crosslinking. Drying under ambient conditions or in a controlled environment for a suitable time duration (e.g., several hours or days) may be sufficient for solvent removal. The treatment to remove or cure the solvent typically occurs after extruding the ink formulation through the deposition nozzle and depositing the one or more continuous filaments on the substrate. It is also contemplated, however, that the treatment may occur after extrusion but prior to or during deposition of the one or more continuous filaments.

The extrusion may be carried out at ambient or room temperature conditions (e.g., from about 18° C. to about 25° C.). The deposition nozzle may be moved and the continuous filament may be deposited at print speeds as high as about 3 m/s, although more typical print speeds range from about 10 micron/s to about 500 mm/s, from about 100 micron/s to about 100 mm/s, or from about 1 mm/s to about 10 mm/s. The deposition nozzle may be microscale in size with an inner diameter or width ranging from about 1 micron to about 1,000 microns (1 mm), and more typically from about 10 microns to 500 microns. Depending on the nozzle size as well as the injection pressure and nozzle translation speed, the extruded filament may have a width or diameter ranging from about 1 micron to about 1 mm, and more typically from about 10 microns to about 500 microns.

The ink formulation fed to the deposition nozzle may be housed in a syringe barrel connected to the nozzle by a Luer-Lok™ or other connector. The extrusion of each of the continuous filaments may take place under an applied pressure of from about 1 psi to about 500 psi or from about 10 psi to about 200 psi. The pressure during extrusion may be constant or it may be varied. By using alternative pressure sources, pressures of higher than 500 psi and/or less than 1 psi may be applied during printing. A variable pressure may yield a continuous filament having a diameter that varies along the length of the filament.

During the extrusion and deposition of each continuous filament, the nozzle may be moved along a predetermined path (e.g., from $(x_1, y_1, z_1)$ to $(x_2, y_2, z_2)$) with a positional accuracy of within ±100 microns, within ±50 microns, within ±10 microns, or within ±1 micron. Accordingly, the filaments may be deposited with a positional accuracy of within ±200 microns, within ±100 microns, within ±50 microns, within ±10 microns, or within ±1 micron.

The continuous filament deposited on the substrate may be understood to encompass a single continuous filament of a desired length or multiple extruded filaments having end-to-end contact once deposited to form a continuous filament of the desired length. In addition, two or more continuous filaments in a given layer of a structure may be spaced apart, as end-to-end contact may not be required. A continuous filament of any length may be produced by halting deposition after the desired length of the continuous filament has been reached. The desired length may depend on the print path and/or the geometry of the structure being fabricated.

The RF device formed by 3D printing comprises a printed dielectric body comprising a triblock copolymer, as described above. End blocks of the triblock copolymer may comprise an aromatic or acrylate polymer and a midblock between the end blocks may comprise an aliphatic polymer. For example, the end blocks of the triblock copolymer may comprise polystyrene and/or a derivative of polystyrene, and the midblock of the triblock copolymer may comprise polybutadiene, polyisoprene, poly(ethylene-ran-butylene), a polybutadiene derivative, a polyisoprene derivative, or a poly(ethylene-ran-butylene) derivative. The triblock copolymer may be selected from the group consisting of polystyrene block-polybutadiene block-polystyrene block (SBS), polystyrene block-polyethylene-ran-polybutylene block-polystyrene block (SEBS), and polystyrene block-polyisoprene block-polystyrene block (SIS).

In some embodiments, the printed dielectric body may be a composite dielectric body comprising the triblock copolymer as a matrix and further comprising a plurality of dielectric filler particles dispersed in the matrix. The dielectric filler particles may be present at a concentration of at least about 20 wt. % and in some cases the concentration may be at least about 40 wt. %, at least about 60 wt. and may be as high as 75 wt. %, or as high as 90 wt. %. Concentrations from about 40 wt. % to about 75 wt. % are typical. The dielectric filler particles may comprise any of the materials or have any of the characteristics set forth above. In one example, the dielectric filler particles comprise a material selected from the group consisting of magnesium oxide, aluminum oxide, titanium dioxide and strontium titanate.

The printed dielectric body may have an average surface roughness of about 2 microns or less, which is beneficial since surface roughness can induce scattering for the highest radio frequencies. The average surface roughness may be as low as, or even lower than, 100 nm, depending on the nozzle size. The printed dielectric body may exhibit a dielectric loss tangent ($\varepsilon''/\varepsilon'$) of less than about 0.005 and/or a dielectric value ($\varepsilon'$) of greater than 2. Typically, the dielectric loss tangent ($\varepsilon''/\varepsilon'$) is about 0.004 or less, or about 0.002 or less, and may be as low as about 0.0002, or as low as about 0.0004. The dielectric value ($\varepsilon'$) may be about 2.1 or greater, about 2.3 or greater, about 2.5 or greater, or about 3 or greater. In some cases, the dielectric value ($\varepsilon'$) may be as high as 10, as high as 20, as high as 100, or as high as 300. Advantageously, the 3D printed RF device operates in the $K_a$ band and is selected from among the following: filter, antenna, lens, radome, horn, transducer and transition.

Experimental Details

Materials:

Polystyrene-block-polybutadiene-block-polystyrene (SBS), polystyrene-block-poly(ethylene-ran-butylene)-block-polystyrene (SEBS), and polystyrene-block-polyisoprene-block-polystyrene (SIS) triblock copolymers are obtained from Sigma Aldrich, Milwaukee Wis. Low molecular weight polystyrene is purchased from Sigma Aldrich, Milwaukee Wis. High molecular weight polystyrene is purchased from Pressure Chemical Company, Milwaukee Wis. All materials are used as purchased without further modification. Polymer molecular weights are determined by gel permeation chromatography in tetrahydrafuran in a Waters 2695 Separations Module with a refractive index detector using polystyrene standards.

Ink Formulations:

Printable ink formulations are created by combining the polymer and solvent in the ratios indicated in Tables 2 and 3. The ink formulations are loaded into Speedmixer DAC 400 planetary mixer (Flaktek, Landrum S.C.) and spun at 2350 RPM for three cycles of 10 minutes.

Ink Rheology:

Inks are characterized by an AR-2000EX Rheometer (TA Instruments, New Castle, Del.) using a 40 mm cone-and-plate geometry. Modulus and yield stress are determined by an amplitude sweep at a frequency of 10 rad/s. Yield stress is defined as the point where the value of the storage modulus drops to 90% of the plateau value. Shear thinning rheology is demonstrated by measuring viscosity at a wide range of steady shear rates.

3D Printing of Solid Block Structures:

Waveguide samples are designed to fit a WR-28 waveguide with interior dimensions 25.4×7.1×3.6 mm³. Printer instructions are written in G code. Samples printed with a 0.2 mm nozzle are written to be 12×10×7 mm³. Z spacing is 0.135 mm, while line spacing within layers is 0.200 mm. The design is built 52 layers thick. Samples printed with a 0.6 mm nozzle are written to be 25×10×7 mm³. Z spacing is 0.405 mm, while line spacing within layers is 0.600 mm. The design is built 18 layers thick. In both cases, alternating layer filled in the rectangles horizontally and vertically. At each direction change, a dwell time of 25 ms is used.

Printing ink formulations are prepared, loaded into syringes, mounted onto a custom 3-axis Aerotech positioning stage or a modified Hyrel System 30 printer (Hyrel3D, Norcross, Ga.) with a custom printhead to hold the dispensing syringe. Each ink formulation is dispensed from a 3 cc syringe places in an HP7x high pressure adapter from Nordson EFD mounted on the head of the printer. Air pressure to the Aerotech printer is supplied by house air through a Nordson EFD Ultimus V controller. Air pressure to the Hyrel printer is supplied by house air through a manual regulator and valve.

Compiled in Tables 7 and 8 are the ink formulations and nozzle size, print speed, and pressure used for printing exemplary solid structures. Since the printed structures are larger than the interior of the WR-28 waveguide, they are trimmed down to fit the interior dimensions of the waveguide. An example of such a printed solid structure is shown in FIG. 8C.

TABLE 7

Ink Formulations and Printing Conditions for 3D Solid Structures

| Ink Id # | Polymer | Nozzle Size (μm) | Print Speed (mm/s) | Pressure (psi) |
|---|---|---|---|---|
| 7 | SBS-1 | 200 | 1.0 | 25 |
| 7 | SBS-1 | 600 | 1.5 | 15 |
| 7 | SBS-1 | 600 | 4.0 | 77 |
| 7 | SBS-1 | 200 | 4.0 | 245 |
| 7 | SBS-1 | 200 | 4.0 | 245 |
| 15 | SEBS-2 | 600 | 1.5 | 16 |
| 18 | SEBS-1 | 600 | 1.5 | 27 |
| 18 | SEBS-1 | 200 | 4.0 | 196 |
| 18 | SEBS-1 | 600 | 4.0 | 49 |
| 19 | SEBS-1 | 600 | 4.0 | 45 |
| 19 | SEBS-1 | 600 | 4.0 | 45 |
| 24 | SIS-3 | 600 | 1.5 | 8 |
| 24 | SIS-3 | 600 | 4.0 | 126 |
| 24 | SIS-3 | 600 | 4.0 | 126 |
| 25 | SIS-3 | 600 | 1.5 | 37 |
| 35 | SBS-1/PS-1 | 200 | 2.0 | 105 |
| 36 | SBS-1/PS-1 | 200 | 2.0 | 98 |
| 39 | SBS-1 | 200 | 6.0 | 189 |
| 40 | SBS-1 | 200 | 6.0 | 217 |
| 41 | SBS-1 | 200 | 6.0 | 189 |
| 42 | SEBS-1 | 200 | 4.0 | 189 |
| 43 | SIS-3 | 200 | 6.0 | 147 |

TABLE 8

Ink Formulations Including Dielectric Filler Particles and Printing Conditions for 3D Solid Structures

| Ink Id # | Polymer | Particle | Nozzle Size (μm) | Print Speed (mm/s) | Pressure (psi) |
|---|---|---|---|---|---|
| 43 | SBS-1 | $Al_2O_3$ | 400 | 6 | 140 |
| 45 | SBS-1 | $Al_2O_3$ | 400 | 6 | 175 |
| 63 | SIS-3 | $Al_2O_3$ | 400 | 6 | 105 |
| 67 | SIS-3 | $Al_2O_3$ | 400 | 6 | 175 |
| 68 | SIS-3 | $Al_2O_3$ | 400 | 6 | 140 |
| 46 | SBS-1 | $Al_2O_3$ | 200 | 4 | 210 |
| 60 | SBS-1 | $Al_2O_3$ | 200 | 4 | 175 |
| 62 | SBS-1 | $Al_2O_3$ | 200 | 4 | 189 |
| 69 | SBS-1 | $Al_2O_3$ | 200 | 4 | 196 |
| 70 | SIS-3 | $TiO_2$ | 233 | 4 | 287 |
| 71 | SIS-3 | $TiO_2$ | 233 | 4 | 255 |
| 72 | SIS-3 | $TiO_2$ | 233 | 4 | 77 |
| 75 | SIS-3 | $TiO_2$ | 200 | 4 | 200 |
| 77 | SIS-3 | $SrTiO_3$ | 200 | 4 | 180 |

3D Printing of Log Pile Structures:

Log pile samples are designed in G code for a 0.2 mm nozzle. Total sample dimensions are 25×25×1.6 mm³, 12 layers thick. The first layer is printed along an x-direction with 5 mm between lines. The second layer is printed along a y-direction, also with 5 mm between lines. The third layer is printed along the x-direction again, but offset by 2.5 mm. The fourth layer is printed along the y-direction again, also offset by 2.5 mm. This four layer sequence is repeated twice more. At each direction change, a dwell time of 25 ms is used. The ink formulations used and the nozzle size, print speed, and pressure are shown in Table 9.

TABLE 9

Ink Formulations and Printing Conditions for Log Pile Structures

| Ink Id # | Polymer | Nozzle Size (μm) | Print Speed (mm/s) | Pressure (psi) |
|---|---|---|---|---|
| 8 | SBS-1 | 200 | 1.0 | 25 |
| 18 | SEBS-1 | 10 | 0.1 | 35 |
| 18 | SEBS-1 | 10 | 0.3 | 119 |
| 18 | SEBS-1 | 200 | 4.0 | 196 |
| 17 | SEBS-1 | 10 | 0.3 | 84 |
| 23 | SIS-3 | 200 | 3 | 119 |
| 39 | SBS | 200 | 4 | 161 |
| 43 | SIS-3 | 200 | 4 | 84 |

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A 3D printed radiofrequency (RF) device comprising:
a printed dielectric body comprising a triblock copolymer including end blocks comprising an aromatic or acrylate polymer and a midblock between the end blocks comprising an aliphatic polymer,
wherein the printed dielectric body is a composite body comprising the triblock copolymer as a matrix and further comprising a plurality of dielectric filler particles dispersed therein; and
wherein the printed dielectric body exhibits a dielectric loss tangent $\epsilon''/\epsilon'$ of less than about 0.005.

2. The 3D printed RF device of claim 1, wherein the printed dielectric body exhibits at least one of an average surface roughness of about 2 microns or less and a dielectric constant ($\epsilon'$) greater than 2.

3. The 3D printed RF device of claim 1, wherein the end blocks of the triblock copolymer comprise polystyrene and/or a derivative of polystyrene;
wherein the midblock of the triblock copolymer comprises polybutadiene, polyisoprene, poly(ethylene-ran-butylene), a polybutadiene derivative, a polyisoprene derivative, or a poly(ethylene-ran-butylene) derivative.

4. The 3D printed RF device of claim 1,
wherein the dielectric filler particles are present at a concentration of at least about 20 wt. %.

5. The 3D printed RF device of claim 1, wherein the RF device operates in the Ka band and is selected from the group consisting of: filter,
antenna, lens, radome, horn, transducer and transition.

6. The 3D printed RF device of claim 1, wherein the dielectric filler particles are present at a concentration of at least 40 wt. %.

7. The 3D printed RF device of claim 1, wherein the dielectric filler particles are present at a concentration of at least 60 wt. %.

8. The 3D printed RF device of claim 1, wherein the dielectric filler particles comprise at least one dielectric material selected from the group consisting of aluminum oxide, boron nitride, beryllium oxide, magnesium oxide, magnesium titanate, titanium dioxide, strontium titanate, barium titanate, molybdenum sulfide, zinc oxide, magnesium carbonate, borosilicate glass, mica, sapphire, fused silica, fused quartz, steatite, soda-line glass, zirconia, and wollastonite.

9. The 3D printed RF device of claim 1, wherein the dielectric filler particles comprise at least one dielectric material selected from the group consisting of magnesium oxide, aluminum oxide, titanium dioxide and strontium titanate.

10. The 3D printed RF device of claim 9, wherein the dielectric filler particles comprise magnesium oxide.

11. The 3D printed RF device of claim 9, wherein the dielectric filler particles comprise aluminum oxide.

12. The 3D printed RF device of claim 9, wherein the dielectric filler particles comprise titanium dioxide.

13. The 3D printed RF device of claim 9, wherein the dielectric filler particles comprise strontium titanate.

14. The 3D printed RF device of claim 1, wherein the dielectric filler particles have an average particle size in the range from about 1 nanometer to about 10 microns.

15. The 3D printed RF device of claim 1, wherein the dielectric filler particles have an average particle size in the range from about 5 nanometers to about 500 nanometers.

16. The 3D printed RF device of claim 1, wherein the dielectric filler particles are surface-modified to increase compatibility with the triblock copolymer.

17. The 3D printed RF device of claim 1, wherein the dielectric filler particles are modified by applying a hydrophobic moiety to the surfaces of the particles.

18. The 3D printed RF device of claim 17, wherein the hydrophobic moiety applied to the surfaces of the particles is moiety selected from the group of titanate, zirconate, aluminate and silane coupling agents and surfactants.

19. A method of making the 3D printed radiofrequency (RF) device of claim 1, the method comprising:
extruding an ink formulation from a deposition nozzle moving relative to a substrate, the ink formulation comprising a triblock copolymer in a solvent, the triblock copolymer including end blocks comprising an aromatic or acrylate polymer and a midblock between the end blocks comprising an aliphatic polymer; and
depositing one or more continuous filaments comprising the ink formulation in a predetermined pattern on the substrate; and
treating the ink formulation to remove or cure the solvent, thereby forming a printed RF device.

20. The method of claim 19, wherein the treating of the ink formulation entails drying, heating and/or exposure to UV radiation.

21. The method of claim 19, wherein the end blocks of the triblock copolymer include an aromatic polymer comprising polystyrene and/or a derivative of polystyrene,
wherein the midblock of the triblock copolymer comprises polybutadiene, polyisoprene, poly(ethylene-ran-butylene), a polybutadiene derivative, a polyisoprene derivative, or a poly(ethylene-ran-butylene) derivative.

22. The method of claim 19, wherein the triblock copolymer is present at a concentration of at least about 40 wt. %.

23. The method of claim 19, wherein the ink formulation further comprises a plurality of dielectric filler particles;
   wherein the dielectric filler particles are present at a concentration of at least about 20 wt. % and the triblock copolymer is present at a concentration of at least about 20 wt. %.

24. The method of claim 19, wherein the solvent comprises an aromatic solvent, a vinyl-containing monomer, or a combination thereof.

25. The method of claim 19, wherein the RF device operates in the Ka band and is selected from the group consisting of: filter, antenna, lens, radome, horn, transducer and transition.

\* \* \* \* \*